Oct. 28, 1930.　　　　　C. TRAUT　　　　　1,779,646
RESEATING DEVICE FOR ROLL CLOSURES
Filed July 2, 1928
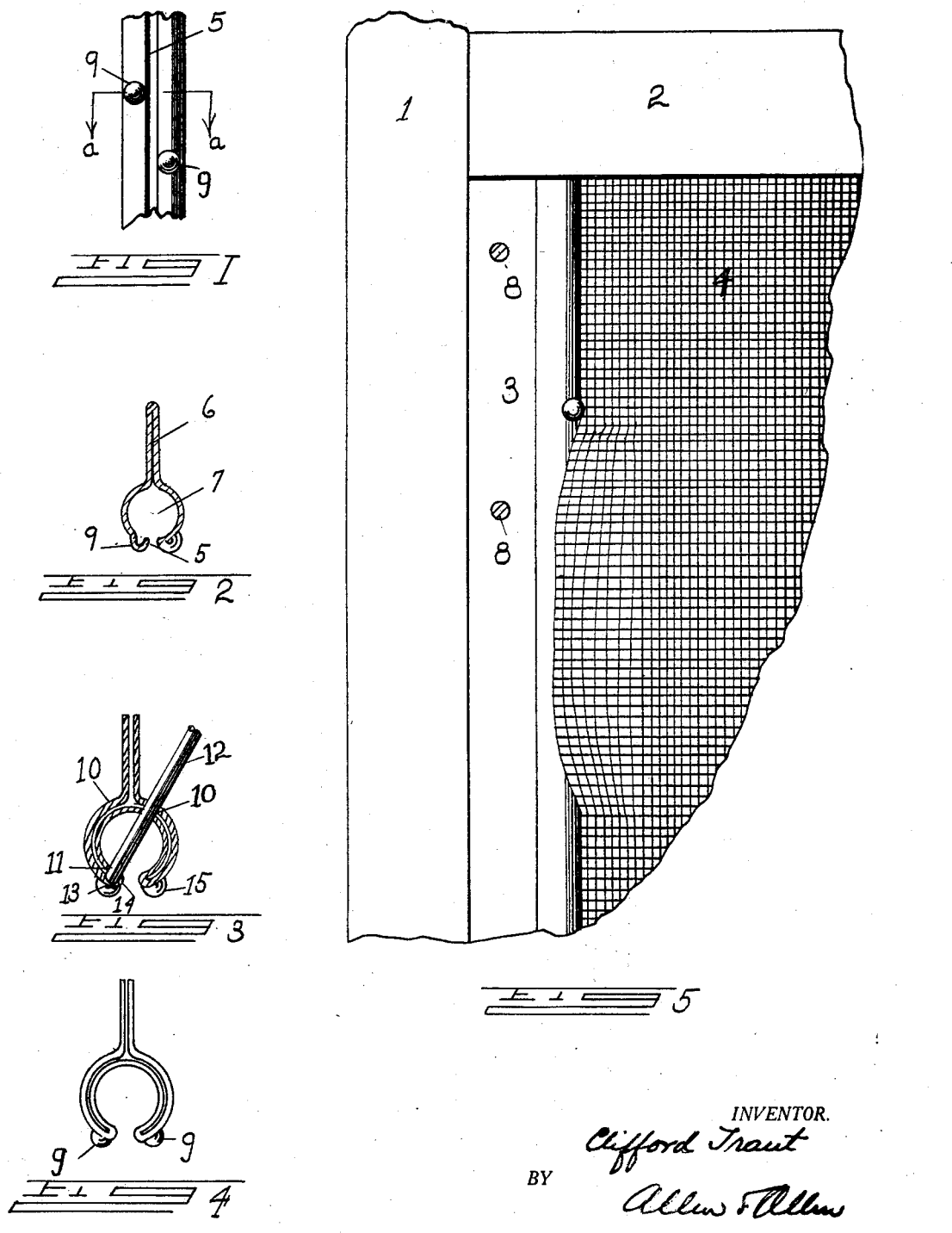
INVENTOR.
Clifford Traut
BY
Allen & Allen
ATTORNEYS.

Patented Oct. 28, 1930

1,779,646

UNITED STATES PATENT OFFICE.

CLIFFORD TRAUT, OF NEWPORT, KENTUCKY, ASSIGNOR TO THE HIGGIN MANUFACTURING COMPANY, OF NEWPORT, KENTUCKY, A CORPORATION OF WEST VIRGINIA

RESEATING DEVICE FOR ROLL CLOSURES

Application filed July 2, 1928. Serial No. 289,822.

My invention is directed to roll closures such for example as screens, curtains and the like for window openings, of the type in which the rolled closure member is pulled down to cover the opening by means of a draw bar operating in guides at the side of the opening, the edges of the closure member itself also riding within these guides. I will describe my invention in its application to roll screens.

While the tension of the spring roller on the screen cloth and against the draw or tension bar at the bottom thereof, is sufficient to keep the screen in a smooth and taut condition and normally to cause its edges to remain within the guides at the side of the window opening so as to form an insect tight closure, accidental displacement of the screen does sometimes occur. Objects such as balls frequently strike the screen from the outside and cause it to bulge inward, or the falling of some object within the building against the screen may cause it to bulge outwardly, in either case bringing the edge of the screen cloth outside the guides. It is an advantage of rolled screens that the screen cloth thus displaced and bent will be straightened by the action of the spring when it has been reseated in the guides; but the problem of reseating it therein is one of considerable importance. It is quite difficult to perform this manually because the operator cannot work from both sides of the screen at once, and it frequently happens that the juncture of the guides and the housing which contains the spring roller at the top of the window is marked by sharp edges which will tear the selvage of displaced screen cloth. If a displacement occurs below the top of the window, and the screen is raised, the displaced portion usually rides to the top of the window where, as just explained, it may be subject to a tearing action. Various attempts have been made to correct this, such as by rounding off the top of the screen guides and the like.

It is however, an object of my invention to provide means for reseating in the guides a displaced portion of the screen cloth before that portion reaches the top of the structure.

It is another object of my invention to provide means which will automatically reseat displaced screen cloth in the guides during an operation of the screen so that no extra operations are required. If a screen embodying my invention is displaced, the operator need only release the tension bar and allow the screen to rise, whereupon the reseating action takes place automatically.

It is still another object of my invention to provide reseating means which are cheap and simple in construction, which are a part of the guides themselves and which involve no extra expense either in the assembly of the screen structure or in its installation in a window opening.

It is still a further object of my invention to provide screen reseating means which preferably do not involve the use of extra parts and which make no difference in the normal operation of the screen, and are so inconspicuous as to be unnoticeable.

These and other objects which will appear in the ensuing disclosure, I accomplish by that certain structure of which I shall now described a preferred embodiment, reference being had to the drawings which accompany this specification.

In Figure 1, I have shown a front view of a guide equipped with my reseating devices.

In Figure 2, I have shown in section the same guide along the line A—A.

In Figure 3, I have shown in section a guide of a somewhat different form, and the method of forming my reseating knobs.

In Figure 4, I have shown an end view of the same guide with the reseating knobs fully formed.

In Figure 5, I have shown a portion of a roll screen assembly with the screen displaced, and indicating how one of my reseating knobs rides the screen back into place upon a manipulation thereof.

Referring first to Figure 5, I have shown a portion of a window frame, 1, at the top of which is a housing 2, containing the spring roller for the screen, the necessary brackets, etc. Following the side of the window frame is a guide member 3. The screen cloth 4 is shown covering the window opening and it will be seen that the edges thereof ride within the slot of the guide. The screen is manipulated as is well understood in the art by means of a tension bar also operating on the guides. This tension bar is not shown.

Several forms of guides are in common use and I have shown two of them in the drawings. Guides in general comprise a portion for attachment to the window frame, a channel portion within which ride the members guiding the movement of the draw or tension bar, and a narrow slot through which attachment is made between the guiding members and the tension bar itself, and within which the edge of the screen cloth rides. This slot which is indicated at 5 in Figure 1, and elsewhere, is so narrow as to form, in connection with the edge of the screen cloth, a satisfactory insect tight closure for the window opening. In Figure 2, the guide shown in Figure 1 is shown in section and it will be seen that this form comprises a single sheet metal member bent upon itself to form an attaching tongue 6, the channel 7 and the slot 5. The edges defining the slot will of course be rounded to minimize abrasion on the screen cloth. The tongue 6 will be perforated for the passage of screws attaching it to the window frame. Two of these screws are shown at 8 in Figure 5.

The other form of guide which I have shown is most clearly indicated in section in Figure 4, the chief difference between the two residing in the bending of the metal in this second form so as to produce a channel and slot with a double metal thickness. In this form the edges of the slot are naturally more rounded and offer less chance for abrasion, and for this reason the form is generally more preferable than that shown in Figure 2.

I have already explained that if the screen cloth in a rolled screen is displaced so that the edges of it come out of the slots producing a bulge, if the screen be raised, this bulge rides to the top of the structure and eventually comes in contact with the housing of the spring roller. Here it is usually torn or badly bent since the construction of the housing at the juncture between it and the guide is not satisfactory alone for reseating the screen in the guide. I have discovered however that if I provide on the guides and adjacent the slot, a comparatively slight knob or protuberance, the bulge in the displaced screen will not ride beyond it but will be reseated in the slot without undue distortion and without any permanent deformation. The action of these little knobs is very positive and very satisfactory and their rounded shape prevents any tearing of the screen edge during the reseating operation. I have shown in Figure 1 in plan, two of these knobs and have indicated them by the numeral 9. They are shown in section in Figure 2 and as indicated are preferably made by peening out the metal of the guides adjacent the slot edges so as to produce a rounded knob in the metal itself. Of course it is possible to attach knobs in the form of rivets or in the form of pieces welded on to the guides; but if this construction is adopted, care must be taken not only that the knobs themselves be satisfactorily smoothed and rounded and that the juncture between them and the guide be also rounded, but in addition that the channel 7 be not interrupted by projections or roughness which would interfere with the operation therealong of the guiding members attached to the tension bar. I am able to peen out these little knobs without producing any such interruption of the channel surface and I find that the little hollow on the reverse side of the knobs, the defining edges of which are also rounded, has no effect on the operation of the roll screen. In the form shown in Figure 2, the knobs may be formed by the peening operation when the guide has been partially formed and before the bend forming the tongue 6 has been entirely closed.

Special means however must be taken in guides of the type shown in section in Figure 4 to do this peening. Of course the knobs may be formed in the metal before the guide has been shaped. This is inconvenient for two reasons: first, because it interferes somewhat with the forming of the guide, and second, because the position of the knobs will vary for different screen structures adapted to different size openings. The guides are generally made up in quantity and are cut as required for the individual screens.

Consequently I prefer to peen out my knobs in already formed guides of this type and I do so by boring a hole 10 beside the neck 6 and directed toward the opposite slot edge. Through the inner metal section of the channel adjacent the slot edge I bore a continuation of the hole 10 which I have indicated at 11 but I do not continue this hole through the outer wall of the channel; and by a suitable peening tool inserted through the holes 10 and 11, I peen out a knob in the outer wall. This operation is clearly shown in Figure 3 where 12 indicates the peening tool; and a partially formed knob in the outer wall is shown at 13. It will be seen from this figure that the hole 11 falls quite inside of the channel and does not interrupt the rounded form of the slot edge as is shown at 14. In this figure a fully formed knob is shown at 15.

I find it ordinarily necessary in each guide to have but two knobs, one on either of the edges defining the slot 5, the knobs themselves being situated near the top of the guide itself. I may however provide more of the knobs situated elsewhere along the slot. As indicated in Figure 1, I prefer to offset the knobs a little from each other for convenience during the peening operation but the knobs may be set, if desired, exactly opposite each other across the slot opening..

Having thus described my invention, what I claim as new and desire to secure by Letters Patent, is:—

1. In a roll closure for windows comprising a guide member with a slot normally holding the edge of the rolled closure member, reseating means for said edge when it becomes displaced, said means comprising a projection formed in the wall of the guide member adjacent the slot without a deforming or an enlarging of the slot opening.

2. In a roll closure comprising a guide with a slot normally holding the edge of the closure member when in operating position, means for reseating said edge when displaced, said means comprising a rounded knob adjacent said slot.

3. In a roll closure comprising a guide with a slot normally holding the edge of the closure member when in operating position, means for reseating said edge when displaced, said means comprising a rounded knob adjacent said slot, one of said knobs located on each side of said slot in said guide.

4. A method of forming reseating devices in the guides for roll closures which comprises boring a hole through the channel portion of said guide for the insertion of a peening tool, inserting a tool through said opening and peening out an external projection in the wall of said guide adjacent the slot.

5. In a guide for roll closures comprising members defining a channel and a slot, a projection for reseating the screen edge when displaced, said projection formed in the metal adjacent said slot but located so as not to interrupt or substantially deflect the slot edge.

CLIFFORD TRAUT.